(12) United States Patent
Janajreh

(10) Patent No.: US 6,213,181 B1
(45) Date of Patent: Apr. 10, 2001

(54) TIRE HAVING A GROOVE WALL LINING FOR REDUCING FORMATION OF ANOMALIES CAUSING SUBJECTIVE USER DISSATISFACTION

(75) Inventor: Ibrahim Mustafa Janajreh, Fountain Inn, SC (US)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/267,467

(22) Filed: Mar. 11, 1999

Related U.S. Application Data

(63) Continuation-in-part of application No. 09/013,452, filed on Jan. 26, 1998, now abandoned.

(51) Int. Cl.[7] .............................. B60C 1/00; B60C 11/04; B60C 11/12; B60C 101/00; B60C 105/00
(52) U.S. Cl. .................................. 152/209.5; 152/209.16; 152/209.18; 152/209.27; 152/901; 152/DIG. 3
(58) Field of Search ............................ 152/209.5, 209.18, 152/209.27, 209.16, 901, DIG. 3

(56) References Cited

U.S. PATENT DOCUMENTS

| | | |
|---|---|---|
| 1,719,628 | 7/1929 | Sloman . |
| 2,121,955 | 6/1938 | Eger . |
| 2,272,879 | 2/1942 | Hargraves . |
| 4,214,618 * | 7/1980 | Takigawa et al. .............. 152/209.16 |
| 4,407,346 | 10/1983 | Bandel et al. . |
| 4,480,671 * | 11/1984 | Giron ............................. 152/209.16 |
| 4,603,721 | 8/1986 | Kogure et al. . |
| 4,683,928 * | 8/1987 | Yahagi ............................. 152/209.5 |
| 4,724,878 * | 2/1988 | Kabe et al. ...................... 152/209.16 |
| 5,614,041 | 3/1997 | Dumke et al. . |
| 5,840,137 | 11/1998 | Futamura . |

FOREIGN PATENT DOCUMENTS

| | | |
|---|---|---|
| 337787 * | 10/1989 | (EP) . |
| 0 337 787 | 10/1989 | (EP) . |
| 0 510 550 A1 | 10/1992 | (EP) . |
| 600404 * | 6/1994 | (EP) . |
| 2-246808 | 10/1990 | (JP) . |
| 2-249707 | 10/1990 | (JP) . |
| 3-169723 * | 7/1991 | (JP) . |
| 4-85104 | 3/1992 | (JP) . |
| 4-306104 | 10/1992 | (JP) . |
| 6-48115 | 2/1994 | (JP) . |
| J08-175116 | 7/1996 | (JP) . |
| WO 99-37489 * | 7/1999 | (WO) . |

OTHER PUBLICATIONS

Abstracts for Japan 6–191221, Japan 2–249707, Japan 6–48115, Japan 4–15107, Japan 58–35504, Japan 60–166506, Japan 4–306104.*

* cited by examiner

Primary Examiner—Steven D. Maki
(74) Attorney, Agent, or Firm—Martin Farrell; Robert R. Reed

(57) ABSTRACT

A tire having a pair of beads; a carcass ply having ends, each of the ends anchored to a respective one of the beads; at least one belt ply extending circumferentially around the tire and disposed radially outward of the carcass ply; and a tread layer disposed radially outward of the at least one belt ply and formed from a first tread compound. The tread layer has a plurality of tread ribs; at least one groove disposed between adjacent tread ribs; and a groove wall lining covering from the at least one groove. The groove wall lining is made from a second tread compound different than the first tread compound.

9 Claims, 4 Drawing Sheets

TIRE HAVING A GROOVE WALL LINING FOR REDUCING FORMATION OF ANOMALIES CAUSING SUBJECTIVE USER DISSATISFACTION

This application is a continuation-in-part of application application Ser. No. 09/013,452 filed on Jan. 26, 1998 now abandoned and which designated the U.S.

BACKGROUND OF THE INVENTION

The present invention relates to a vehicle tire. Specifically, the invention relates to a pneumatic vehicle tire having a groove wall lining that reduces the formation of anomalies causing subjective user dissatisfaction.

Tires, especially commercial vehicle tires, may be removed from service due to anomalies on the tread region. These anomalies are depressions in the tread rib or tread block. The anomalies can be caused by unequal normal stress distribution laterally across the rib or block.

The stress concentration occurs at the edges of the tread rib or block. The stress concentration at the edges of the tread rib or block is known as the edge effect. The central portion of the tread rib or block experiences a lower stress than the edges of the tread rib or block. The stress at the edge of the tread rib or block may be approximately twice as large as the stress at the central portion of the tread rib or block. The stress concentration at the edges of the tread rib or block typically causes anomalies to form at the edges of the tread rib or block.

Once an anomaly forms at the edge of the rib or block, the anomaly will propagate to the remainder of the rib or block; and often to adjacent ribs or blocks. The propagation of the anomaly occurs quickly as the tire continues to roll.

The decision to remove a tire is subjective and may depend on the location of the tire on the truck/trailer combination. Generally, a driver can feel an anomaly on a steering tire by the ride comfort and handling of the vehicle. In that case, the driver pulls the tire when uncomfortable with the ride and/or handling of the vehicle. However, if a tire having an anomaly is a drive tire or is located on the trailer, the driver may not sense any discomfort. The driver may, however, hear an increase in tire noise. If the driver does not sense discomfort or an increase in noise, the driver will pull the tire during a subsequent visual inspection of the vehicle.

The removal of a tire due to anomalies causing subjective user dissatisfaction is premature when considering the portions of the tire without the anomaly. The portions of the tire without the anomaly are capable of substantial additional service on the vehicle. Extending the time until the onset of an anomaly or decreasing the severity of the anomaly once found may extend the life of the tire. The extended life of the tire reduces the cost of purchase and installation of new tires. In the commercial trucking field, these potential cost savings are significant.

Thus, it is an object of the present invention to provide a tire with an improved tread portion which reduces the formation of anomalies causing subjective user dissatisfaction.

It is a further object of the present invention to provide a tread portion which eliminates the edge effect or exhibits a reduced edge effect, defined as the high normal stress value at the edges of a tread rib or block as compared to the center portion of a tread rib or block.

It is a further object of the present invention to provide a tread portion which more uniformly distributes normal stress laterally across a tread rib or block.

SUMMARY OF THE INVENTION

These and other objects of the present invention are accomplished in a first embodiment of the present invention by a tire having a pair of beads; a carcass ply having ends, each of the ends anchored to a respective one of the beads; at least one belt ply extending circumferentially around the tire and disposed radially outward of the carcass ply; and a tread layer disposed radially outward of the at least one belt ply and formed generally from a first tread compound. The tread portion has at least a pair of shoulder ribs and a plurality of tread ribs each having a defining circumferential groove on each side thereof with two walls and a base; and a groove lining defining the groove walls and base forming composite shoulder and tread ribs. The groove lining is made from a second tread compound different than the first tread compound.

The tread portion has a radial thickness and extends laterally beneath the base of each groove which is defined by the groove lining. The groove lining in the area of the groove base has a radial thickness which is between about 25 and 50 percent of the combined tread layer and groove lining thickness in this area.

The composite shoulder and tread ribs are formed with a lateral width of which the groove wall lining of each wall comprises between 15 and 30 percent.

The tread compound forming the groove lining has a modulus of elasticity which is 40 to 80 percent of the modulus of elasticity of the tread compound forming the tread portion.

The tread ribs may include sipes and the groove lining may include sipes.

BRIEF DESCRIPTION OF THE DRAWINGS

Other objects of the present invention will become apparent from the following description with reference to the accompanying drawings, wherein.

DETAILED DESCRIPTION OF THE PREFERRED EMBODIMENTS

This application uses numerous phrases and terms of art. The phrase "mid-circumferential plane" refers to the plane passing through the center of the tread and being perpendicular to the axis of rotation of the tire.

The term "radial" refers to the direction perpendicular to the axis of rotation of the tire.

The term "axial" refers to the direction parallel to the axis of rotation of the tire.

The term "lateral" refers to the direction along the tread of the tire going from one sidewall of the tire to the other sidewall.

The term "groove" refers to an elongated void area in the tread that may extend circumferentially or laterally in a straight, curved of zig-zag manner.

The phrase "tread width" refers to the greatest axial distance across the main portion of the tread in constant contact with a road surface, as measured from a footprint of the tire, when the tire is mounted on a rim, subjected to a load, and inflated to a pressure corresponding to the load. All of the other tire dimensions are measured when the tire is mounted on a rim and inflated to a given pressure, but not subjected to a load.

The phrase "tread depth" refers to the radial extent, or height, of a tread block or rib on a tread portion of a tire.

The term "rib" refers to a continuous circumferential rib or a circumferential arrangement of rib blocks.

The term "tread portion" refers to a rubber crown area of the tire radially outside of any reinforcing layers of the tire for contacting a surface to support a vehicle.

The phrase "modulus of elasticity" refers to the modulus of elasticity measured at ten percent (10%) unit elongation.

A tire having a tread portion capable of reducing the formation of anomalies causing subjective user dissatisfaction will now be described with reference to FIGS. 1–5.

Figure 1:
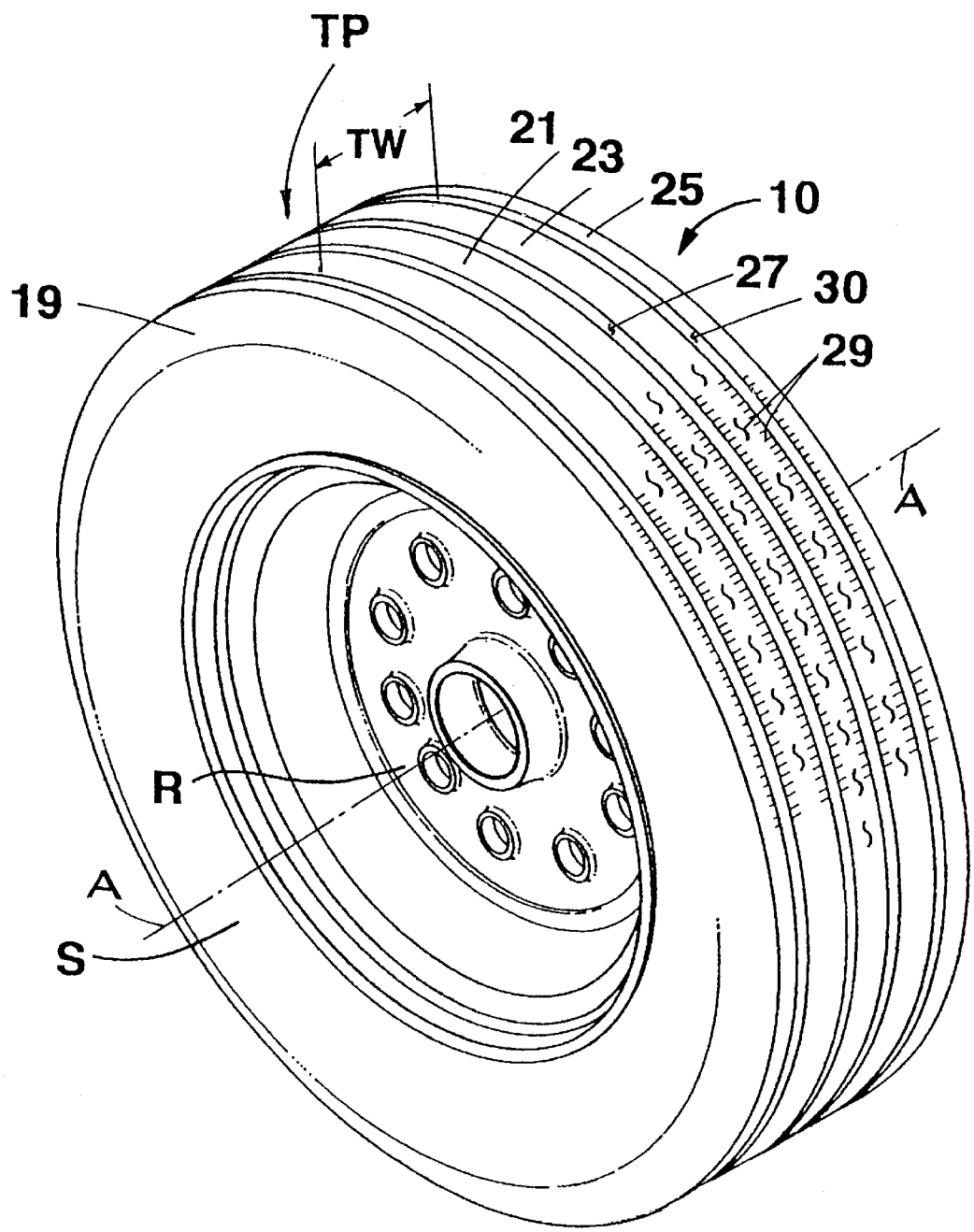
FIG. 1 is a perspective view of a tire having a tread portion of the present invention.

FIG. 1 is a perspective view of a tire 10 mounted on a rim R. The exterior features of tire 10 include sidewalls S and a tread portion TP having a tread width TW. The tread portion contacts a supporting surface when the rim is mounted on the axle of a vehicle and rotated about an axis of rotation A. Tread portion TP of tire 10 uses a unique design for the groove between adjacent ribs. The specific groove design is described in greater detail below.

Figure 2:
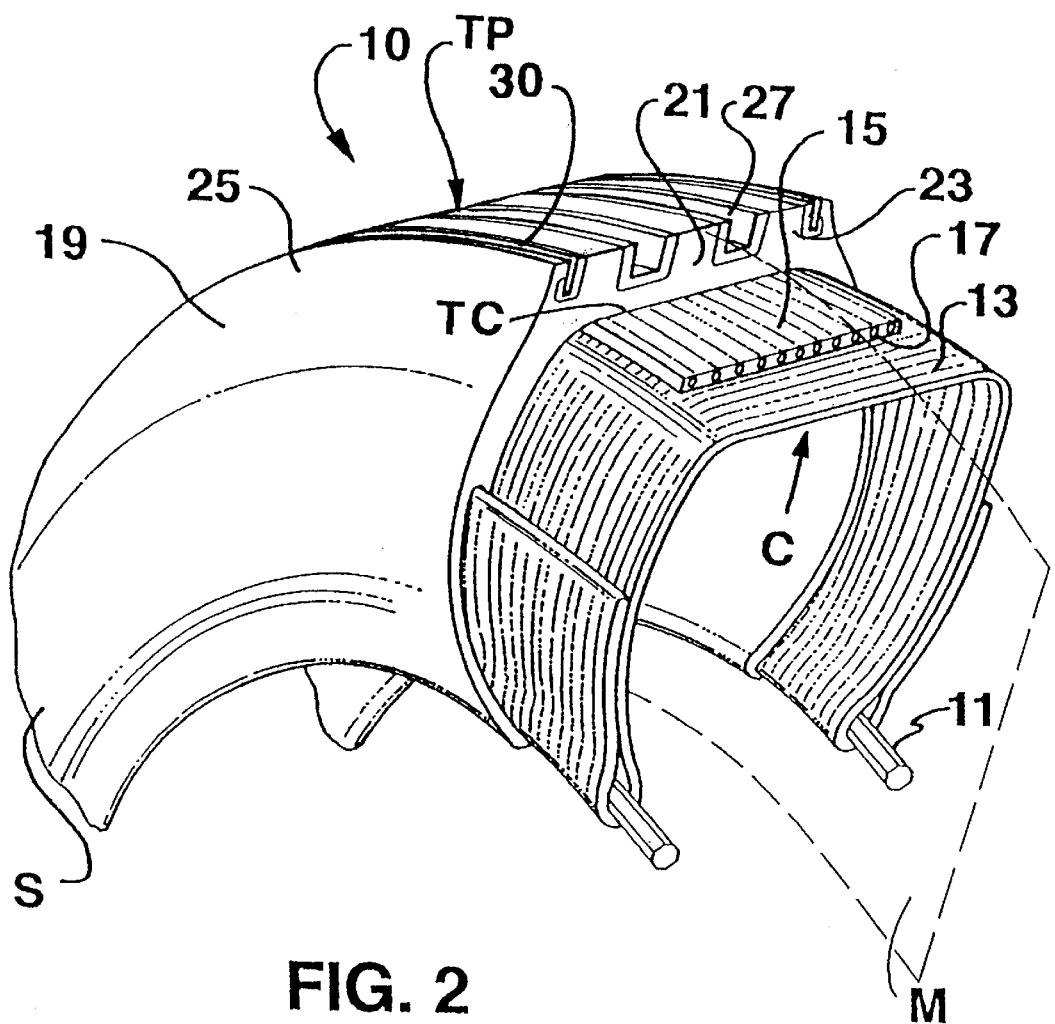
FIG. 2 is a perspective, cross-sectional view of a tire having a tread portion of the present invention.

FIG. 2 is a perspective, cross-sectional view of the exterior and interior features of tire 10 having tread portion TP. Tire 10 includes a pair of annular beads 11 on axially opposite sides of a midcircumferential plane M. Beads 11 securely mount tire 10 to rim R for use on a vehicle (not shown). Opposite ends of at least one carcass ply 13 anchor to beads 11. The middle portion of carcass ply 13 forms part of sidewalls S and a crown portion C. Crown portion C extends between sidewalls S. At least one belt ply 15 is positioned radially outward of carcass ply 13. Belt ply 15 includes reinforcing cords 17. In commercial vehicle tires, reinforcing cords 17 are typically manufactured from steel. Sidewalls S include shoulder regions 19. Tread portion TP occupies the radially outermost extent of crown portion C and is situated between shoulder regions 19, and joins sidewalls S.

Tread portion TP contacts the ground during rolling movement of tire 10. Tread portion TP may include conventional tire tread sculpture features, such as circumferential grooves 27, shoulder grooves 30, lateral grooves (not shown), and sipes 29 in a central portion and at an edge of tread ribs 21, shoulder ribs 23, and decoupling or sacrificial ribs 25 (see FIG. 1). Circumferential grooves 27 and shoulder grooves 30 can be straight grooves, or grooves having an undulating, or zig-zag, pattern. Circumferential grooves 27 separates adjacent tread ribs 21.

In shoulder region 19, tire 10 can include a shoulder rib 23 and a decoupling, or sacrificial, rib 25. The desirability of a decoupling rib on a shoulder portion of a tire is discussed in U.S. Pat. No. 4,480,671 to Giron.

Figure 3:
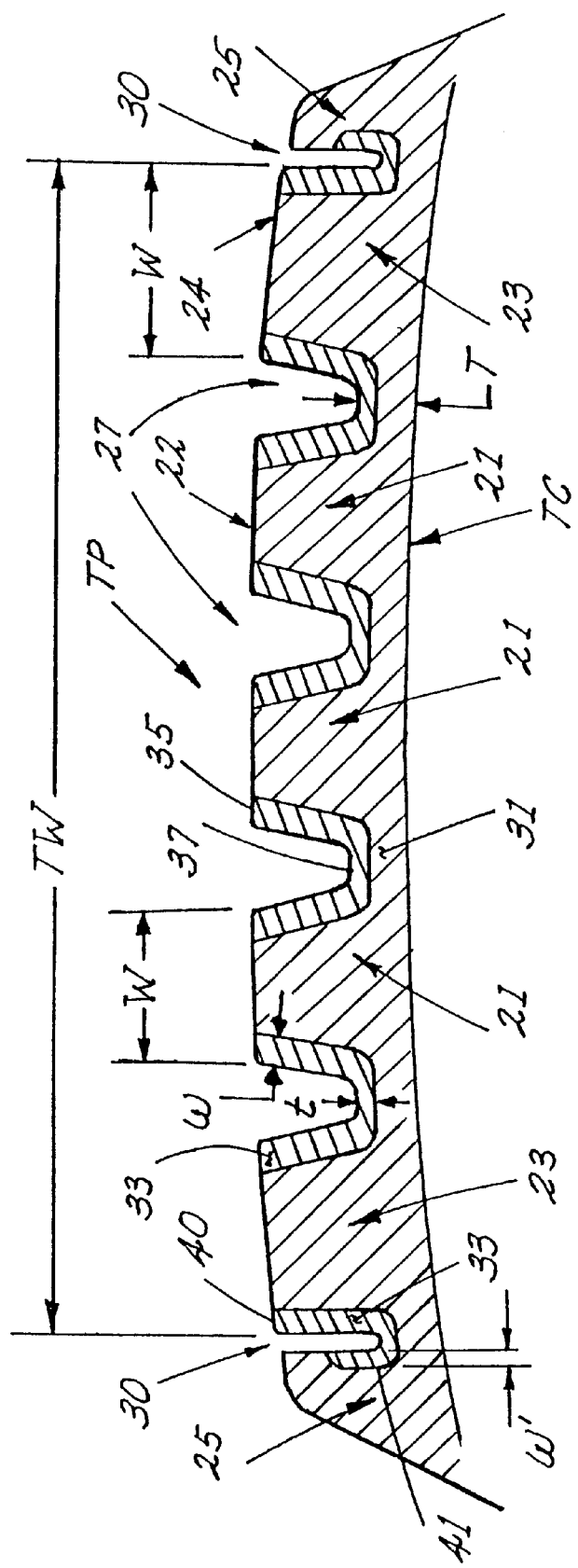
FIG. 3 is a cross-sectional view of a tread portion of the present invention.

As seen in FIG. 3, tread portion TP has two components, a main component 31 and a groove lining 33. Main component 31 is formed of a first tread compound and encompasses the majority of tread portion TP. Main component 31 is located laterally of tread portion TP and radially of belt ply 15 along line TC. Groove lining 33 occupies the remaining volume of tread portion TP and is formed from a second tread compound.

Tread portion TP as shown in FIG. 3, is formed to include a plurality of circumferential grooves 27 and a pair of shoulder grooves 30. Each groove 27, 30 is defined by a bottom or base laterally separating a pair of radially extending walls. Between each pair of grooves 27 a tread rib 22 is formed while between the lateral most grooves 27 and shoulder grooves 30, a pair of shoulder ribs 24 are formed. The walls of grooves 27 and 30, defining tread ribs 22 and shoulder ribs 24, along with each groove base are defined by groove lining 33 of the second tread compound.

As seen in FIG. 3, groove lining 33 completely lines grooves 27, both in the lateral and in the radial directions. Groove lining 33 includes radial portions 35 which form opposing walls of groove 27. Radial portions 35 of groove lining 33 can mirror the contour of the surface of the main component 31 along each groove 27. Radial portions 35 have a lateral width w. A portion 37 of lining 33 extends across the base of groove 27 and connects with radial wall portions 35. Lateral portion 37 has a thickness t in the area laterally across the base or bottom surface of groove 27.

Groove lining 33 defines also at least the laterally inner walls of shoulder grooves 30, as shown at 40, along with the base of the groove and at least the radially innermost portion of the lateral outer walls thereof, as shown at 41. The radial portion 40 is shaped as the main component 31 while radial portion 41 is formed in a circumferential cavity formed adjacent to base 37 and radially inwardly of the radial outer extremity of shoulder groove 30. The circumferential cavity allows the laterally inner face of groove lining 33 over the lateral outer wall, as shown at 41, and the uncoated portion of the remainder of the outer portion of the wall to extend along a mutual circumferential plane. Radial portion 40 of groove lining 33 has a lateral width w while the radial portion at 41 of groove lining 33 has a lateral width w'. Lateral widths w and w', while not necessarily being equal in width, are preferably between 3 and 9 mm although they may be slightly larger or smaller.

Decoupling ribs 25 are formed between the lateral outer wall of shoulder groove 30 and the radially outer portion of shoulder 19 and are formed primarily of main component 31.

The portion 21 of the tread ribs formed by the main component 31 along with groove lining 33 combine to form composite tread ribs 22. Shoulder ribs portions 23 formed by the main component 31 along with groove lining 33 combine to form composite shoulder ribs 24. Composite tread and shoulder ribs have a lateral width W. In the area of the base or bottom of grooves 27 and 30, tread portion TP has a radial thickness T which is the combined radial thickness of main component 31 and groove lining 33 at base 37. Typically thickness T is between 4 and 8 mm although the range can vary slightly at each extreme. In typical long haul commercial vehicles composite tread ribs 22 and composite shoulder ribs 24 have a lateral width W which is between approximately 28 and 43 mm although these limits may vary slightly in each direction. It is noted that composite tread ribs 22 and composite shoulder ribs 24 are not necessarily of equal lateral width.

Figure 4:
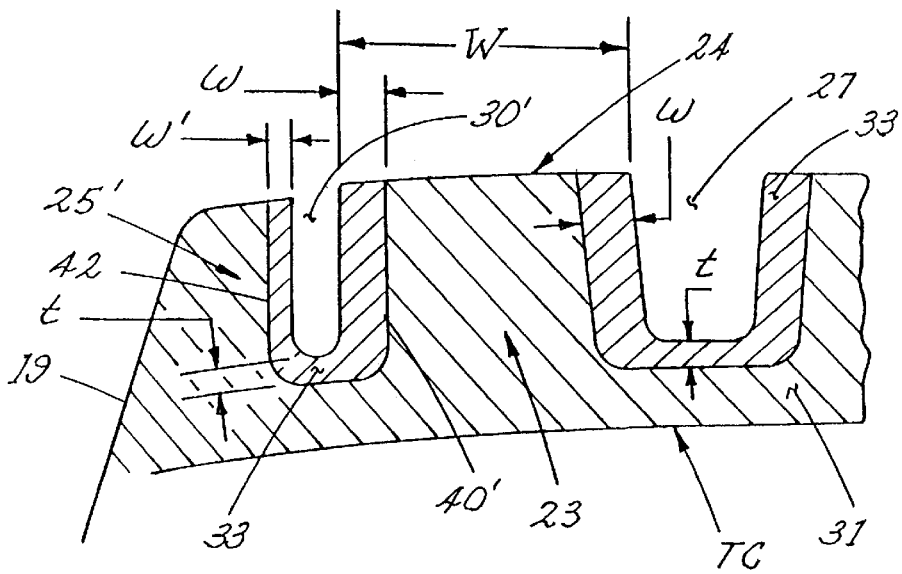
FIG. 4 is a partial cross-sectional view of the invention with a second embodiment of the decoupling rib structure.

In a second embodiment shown in FIG. 4, decoupling rib 25' is formed between the lateral outer wall of groove 30' and the radially outer portion of shoulder 19. In this embodiment, the walls of shoulder grooves 30' extend radially outward along a single plane. Groove lining 33 forms the entire surface of the lateral inner wall of the groove at a width w and the entire surface of the lateral outer wall at the width w'. Lining 33 extends across the bottom of groove 30' at a radial thickness t. A radial thickness T is defined to included the thickness t combined with the radial thickness of main component 31 at the base of shoulder groove 30'. Decoupling rib 25' is also formed primarily of main component 31.

It is noted that while lateral widths w and w' are within the same size range, they are normally not equal. Preferably width w is slightly wider than width w' by about 1 mm.

Figure 5:
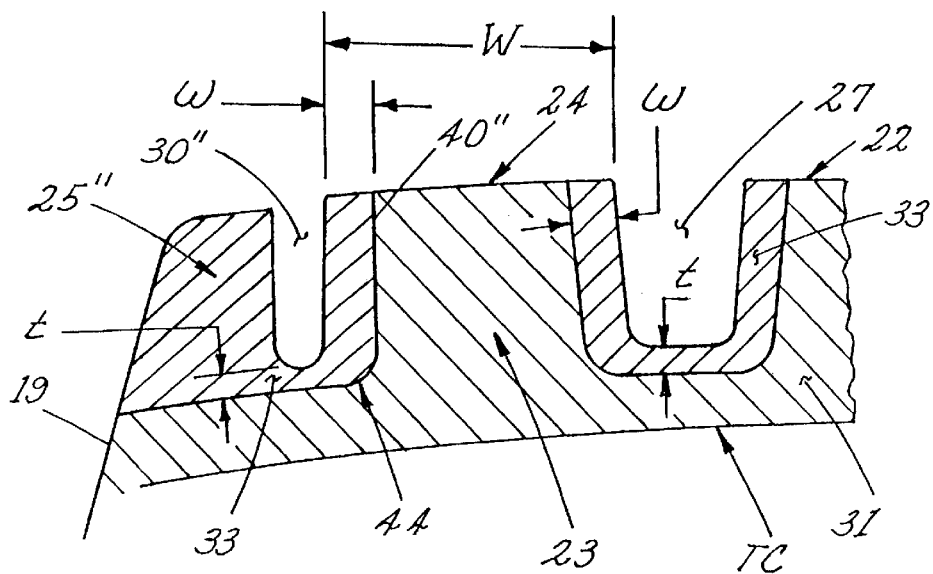
FIG. 5 is a partial sectional cross-section of the invention with a third embodiment of the decoupling rib structure.

In a third embodiment shown in FIG. 5, the radial and lateral outer circumference of main component 31 of tread portion TP is formed as a L-shaped shoulder 44. Groove lining 33, forms shoulder 44 and shoulder groove 30". Radial portion 40", which comprises the coating for the lateral inner wall of shoulder groove 30", covers the lateral outer radial surface of shoulder rib 23. Radial portion 40" is formed at a width w. Decoupling rib 25" is formed between the lateral outer wall of shoulder groove 30" and the radial outer extend of shoulder 19. A radial thickness t is defined by groove lining 33 between the bottom of shoulder groove 30" and main component 31. A radial thickness T is defined to include the radial thickness of groove lining 33 at the bottom of the groove and the radial thickness of main compound 31 below the bottom of shoulder groove 30".

The tread depth of the decoupling ribs may be equal to or less than that of the shoulder ribs and the tread ribs. The particular tread design with which the instant invention is employed will determine the relative tread depth of these ribs.

The specific geometric and physical characteristics of the groove lining 33 and the main component 31, and the relationships therebetween will now be discussed.

The modulus of elasticity E measures, among other characteristics, the hardness of a particular tread compound. The hardness of a particular tread compound can prove to be both beneficial and detrimental to the performance of a tire. For instance, a harder tread compound may be beneficial in terms of tread wear rate and rolling resistance when compared to a softer tread compound. However, the hard tread compound can be more susceptible to an edge effect and have less wet traction than the softer tread compound.

On the other hand, a softer tread compound may be less susceptible to the edge effect and have greater wet traction than a harder tread compound. However, the softer tread compound may have a greater tread wear rate and higher rolling resistance than the harder tread compound.

The present invention utilizes two tread compounds to take advantage of the benefits of both softer and harder tread compounds at specific locations on tread portion TP.

The modulus of elasticity for the two tread compounds is measured at ten percent (10%) unit elongation by the standard ASTM test. In a preferred embodiment, the modulus of elasticity ($E_{31}$) of the first tread compound for the main component 31 is within a range of approximately 4 to 8 mega Pascals (Mpa). The modulus of elasticity ($E_{33}$) of the second tread compound selected for use in the groove lining 33 should satisfy the following approximate ratio:

$$\frac{E_{33}}{E_{31}} \approx 0.4 \text{ to } 0.8$$

In other words, the second tread compound used as groove lining 33 is softer than the first tread compound used as main component 31. The preferred ratio between the modulus of elasticity ($E_{33}$) of the second tread compound used in groove lining 33 and the modulus of elasticity ($E_{31}$) of the first tread compound used in main portion 31 should be approximately 0.65.

Although FIGS. 1 and 2 show tire 10 as having a typical array of siping 29 at the edges of tread rib 21 (including groove lining 33), the present invention is also capable of use with a fewer number of sipes 29 on tread rib 21, or with no sipes on tread rib 21. Theoretically, the lower end of the ratio between the modulus of elasticity is more appropriate for a tire with a fewer number of sipes on the tread rib, or no sipes on the tread rib. Also, the upper end of the ratio between the moduli of elasticity is theoretically more appropriate for a tire with a greater number of sipes on the tread rib.

Also in the preferred embodiment, lateral width w of radial portions 35 and 40 and lateral width W of composite tread rib 22 and shoulder ribs 24 should satisfy the following approximate ratio:

$$\frac{w}{W} \approx 0.15 \text{ to } 0.3$$

Preferably, the ratio between lateral width w of radial portion 35 and lateral width W of composite ribs 22 and 24 is approximately 0.2. In the preferred ratio, main component 31 encompasses at least 50 percent of the lateral width W of the composite ribs 22, 24. In a long haul commercial vehicle tire, lateral width w of each radial portions 35 or 40 is preferably between approximately 6 and 9 mm, although these limits may be slightly larger or smaller.

To prevent the formation of cracks propagating from the base of grooves 27, portion 37 of groove lining 33 should extend laterally across the bottom of groove 27 and 30. In the preferred embodiment, radial thickness t of groove lining 33 over lateral portion 37 and radial thickness T of tread portion TP should satisfy the following approximate ratio:

$$\frac{t}{T} \approx 0.25 \text{ to } 0.5$$

Preferably, the ratio between the radial thickness t of lateral portion 37 and radial thickness T of tread portion TP is approximately 0.4. In a long haul commercial vehicle tire, radial thickness t of lateral portion 37 is preferably between approximately 2 and 3.5 mm, although these limits may vary slightly in each direction.

It has also been found that radial thickness t of lateral portion 37 of groove lining 33 should also always be less than the lateral thickness w of lateral portion 37. The desired ratio is for t to have a thickness which is between 22% to 58% of the thickness w.

An experiment was performed to determine the effectiveness of the present invention to reduce the formation of anomalies causing subjective user dissatisfaction. The experiment utilized tires that were identical in all aspects, save the groove wall lining. The tread portion of one set of tires lacked a groove wall lining. The tread portion of the other set of tires had a groove wall lining. The groove wall lining satisfied the parameters of the modulus of elasticity, thickness and lateral width described above.

The experiment established that the present invention reduced the formation of anomalies on the tread portion that causes subjective user dissatisfaction. Specifically, the experiment established that the stress concentration at the edges of the shoulder ribs and the tread ribs was reduced significantly. The normal stress distribution of a tire having the groove wall lining of the present invention was more uniform laterally across each rib of the tire. The experiment also established that tires having the groove wall lining of the present invention required a greater amount of use, or mileage, to exhibit an anomaly causing subjective driver discomfort.

Applicant also understands that the invention does not merely apply to new tires. For example, Applicant recognizes that the present invention can be applied to tread layers used with retreaded tires and to tire tread layers in strip form which are ultimately cured before or after mounting on a tire casing.

Applicant also recognizes that the present invention is not limited to commercial vehicle tires. For example, automobile tires can benefit from the present invention.

The above description is given in reference to the preferred embodiment of a tire having a tread portion for reducing the formation of anomalies causing subjective user dissatisfaction. However, it is understood that many variations are apparent to one of ordinary skill in the art from a reading of the disclosure of the invention. Such variations and modifications apparent to those skilled in the art are within the scope and spirit of the instant invention as defined by the following appended claims.

What is claimed is:

1. A tread layer for a tire, said tire having a pair of beads; a reinforced carcass ply having ends anchored to a respective one of said beads; and at least one belt ply extending circumferentially around said tire and disposed radially outward of said carcass ply, said tread layer including a first tread compound with a first modulus of elasticity and comprising:

a plurality of circumferential grooves and shoulder grooves formed in said tread layer, each said circumferential groove and shoulder groove having walls separated by a base;

at least one tread rib disposed between adjacent circumferential grooves;

at least one shoulder rib disposed between each shoulder groove and an adjacent circumferential groove;

groove linings defining said walls and said base of each of said circumferential grooves and said shoulder grooves, and forming at least one composite tread rib and at least one composite shoulder rib, said groove linings being formed from a second tread compound having a second modulus of elasticity;

wherein, a ratio of said second modulus of elasticity to the first modulus of elasticity is between about 0.4 to 0.8, and, said groove linings at said circumferential groove walls and said shoulder groove walls have a substantially lateral width w of between 6 and 9 mm, and said groove linings at each circumferential groove base and each shoulder groove base have a radial thickness t of approximately 2 to 3.5 mm.

2. The tread layer as recited in claim 1, wherein said at least one composite tread rib and shoulder rib include sipes.

3. The tread layer as recited in claim 1, wherein said groove linings at said circumferential groove walls and said shoulder groove walls include sipes.

4. The tread layer as recited in claim 1, wherein said at least one composite tread rib has a lateral width and wherein a ratio of said lateral width of said groove linings w to said lateral width of said composite tread rib is between about 0.15 to 0.3.

5. The tread layer as recited in claim 1, wherein said tread portion at a circumferential groove base and a shoulder groove base has a second radial thickness, a ratio of the radial thickness t to the second radial thickness being between about 0.25 to 0.5.

6. The tread layer of claim 1, further including decoupling ribs located axially outward of said composite shoulder ribs, each of said decoupling ribs being defined by a radially outer portion of a respective shoulder and an axially outer wall of a respective shoulder groove, said groove linings defining at least a radially inner portion of said axially outer wall of said shoulder groove.

7. The tread layer of claim 6, wherein groove linings at said axially outer wall of said shoulder groove have a lateral width of 50 to 100 percent of the lateral width w of groove linings at walls of said circumferential grooves.

8. The tread layer of claim 6 wherein groove linings at said axially outer walls of said shoulder grooves extend radially the full height of said axially outer walls to define entirely said axially outer walls.

9. The tread layer of claim 6, wherein said decoupling ribs are formed of said second tread compound.

* * * * *